(12) United States Patent
Dejneka et al.

(10) Patent No.: US 10,421,681 B2
(45) Date of Patent: Sep. 24, 2019

(54) ALUMINA ISOPIPES FOR USE WITH TIN-CONTAINING GLASSES

(75) Inventors: Matthew J. Dejneka, Corning, NY (US); Benjamin Z. Hanson, Big Flats, NY (US); Thomas D. Ketcham, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 406 days.

(21) Appl. No.: 13/112,302

(22) Filed: May 20, 2011

(65) Prior Publication Data
US 2012/0006059 A1    Jan. 12, 2012

Related U.S. Application Data

(60) Provisional application No. 61/363,445, filed on Jul. 12, 2010.

(51) Int. Cl.
C03B 17/06 (2006.01)
C04B 35/10 (2006.01)
C03B 5/43 (2006.01)

(52) U.S. Cl.
CPC .............. C03B 17/064 (2013.01); C03B 5/43 (2013.01); C04B 35/10 (2013.01);
(Continued)

(58) Field of Classification Search
CPC ....... C03B 17/00; C03B 17/06; C03B 17/064; C04B 35/10; C04B 2235/72
(Continued)

(56) References Cited

U.S. PATENT DOCUMENTS 3,026,210 A    3/1962  Coble
3,338,696 A    8/1967  Dockerty ................. 65/145
(Continued)

FOREIGN PATENT DOCUMENTS

CN    1244513 A    2/2000
CN    101163645 A    4/2008
(Continued)

OTHER PUBLICATIONS

Ceralox Spray Dried Aluminas, (Mar. 2004) pp. 1-2, Sasol data sheet.*
(Continued)

*Primary Examiner* — Cynthia Szewczyk
(74) *Attorney, Agent, or Firm* — Thomas R. Beall; Ryan T. Hardee

(57) ABSTRACT

Isopipes (13) for making glass sheets using a fusion process are provided. The isopipes are made from alumina materials which have low levels of the elements of group IVB of the periodic chart, i.e., Ti, Zr, and Hf, as well as low levels of Sn. In this way, the alumina isopipes can be used with glasses that contain tin (e.g., as a fining agent or as the result of the use of tin electrodes for electrical heating of molten glass) without generating unacceptable levels of tin-containing defects in the glass sheets, specifically, at the sheets' fusion lines. The alumina isopipes disclosed herein are especially beneficial when used with tin-containing glasses that exhibit low tin solubility, e.g., glasses that have (RO+$R_2O$)/$Al_2O_3$ ratios between 0.9 and 1.1, where, in mole percent on an oxide basis, (RO+$R_2O$) is the sum of the concentrations of the glass' alkaline earth and alkali metal oxides and $Al_2O_3$ is the glass' alumina concentration.

14 Claims, 8 Drawing Sheets

(52) U.S. Cl.
CPC ............. *C04B 2235/3201* (2013.01); *C04B 2235/3206* (2013.01); *C04B 2235/3208* (2013.01); *C04B 2235/3222* (2013.01); *C04B 2235/3232* (2013.01); *C04B 2235/3241* (2013.01); *C04B 2235/3244* (2013.01); *C04B 2235/3272* (2013.01); *C04B 2235/3284* (2013.01); *C04B 2235/3286* (2013.01); *C04B 2235/3293* (2013.01); *C04B 2235/3409* (2013.01); *C04B 2235/3418* (2013.01); *C04B 2235/449* (2013.01); *C04B 2235/72* (2013.01); *C04B 2235/80* (2013.01); *C04B 2235/81* (2013.01); *C04B 2235/95* (2013.01); *Y02P 40/57* (2015.11)

(58) Field of Classification Search
USPC .................................................. 65/29.16, 193
See application file for complete search history.

(56) References Cited

U.S. PATENT DOCUMENTS

| | | | |
|---|---|---|---|
| 3,437,470 A | 4/1969 | Overman | ............. 65/195 |
| 3,505,158 A | 4/1970 | Murray | |
| 3,652,307 A | 3/1972 | Bakker | |
| 3,682,609 A * | 8/1972 | Dockerty | ............. 65/83 |
| 3,879,210 A | 4/1975 | LaBar | |
| 4,018,965 A * | 4/1977 | Kerko et al. | ............. 428/410 |
| 4,148,661 A | 4/1979 | Kerko et al. | |
| 4,568,652 A | 2/1986 | Petty | |
| 5,116,789 A | 5/1992 | Dumbaugh, Jr. et al. | |
| 5,296,420 A | 3/1994 | Garvie | |
| 6,159,885 A * | 12/2000 | Mizuno et al. | ............. 501/127 |
| 6,814,917 B1 | 11/2004 | Watanabe et al. | |
| 6,974,786 B2 | 12/2005 | Helfinstine et al. | ............. 501/106 |
| 7,534,734 B2 | 5/2009 | Ellison | ............. 501/66 |
| 7,666,511 B2 | 2/2010 | Ellison et al. | ............. 428/426 |
| 7,829,745 B1 | 11/2010 | Horn | ............. 568/312 |
| 7,851,394 B2 | 12/2010 | Ellison | ............. 501/66 |
| 8,490,432 B2 | 7/2013 | Berkey et al. | |
| 2003/0121287 A1 | 7/2003 | Chalk et al. | ............. 65/90 |
| 2006/0236722 A1 | 10/2006 | Delia et al. | |
| 2007/0068197 A1 | 3/2007 | Pitbladdo | |
| 2008/0057275 A1* | 3/2008 | Grzesik et al. | ............. 428/195.1 |
| 2008/0131651 A1* | 6/2008 | Burdette et al. | ............. 428/98 |
| 2009/0111679 A1* | 4/2009 | Lu | ............. 501/103 |
| 2009/0215607 A1 | 8/2009 | Dejneka et al. | ............. 501/27 |
| 2010/0084016 A1* | 4/2010 | Aitken et al. | ............. 136/258 |
| 2010/0087307 A1 | 4/2010 | Murata et al. | |
| 2010/0251774 A1 | 10/2010 | Peterson | ............. 65/193 |
| 2011/0045961 A1 | 2/2011 | Dejneka et al. | |
| 2012/0180528 A1 | 7/2012 | Ketcham et al. | |

FOREIGN PATENT DOCUMENTS

| | | | |
|---|---|---|---|
| CN | 101208276 A | 6/2008 | |
| CN | 101277799 A | 10/2008 | |
| EP | 0 850 897 A1 | 7/1998 | |
| EP | 0850897 | 7/1998 | ............. C04B 35/111 |
| EP | 0976697 A1 | 7/1999 | |
| GB | 1 072 536 A | 6/1967 | |
| JP | H07(1995)-315915 | 12/1995 | ............. C04B 35/101 |
| JP | H10(1998)-236866 | 8/1998 | ............. C04B 35/10 |
| JP | 11-246230 | 9/1999 | |
| JP | 2007-197303 A | 8/2007 | |
| WO | 2006/073841 | 7/2006 | |
| WO | WO 2009/070263 | 6/2009 | |

OTHER PUBLICATIONS

T.D. Ketcham, et al., "High Static Fatigue Alumina Isopipes", U.S. Appl. No. 61/363,445, filed Jul. 12, 2010.
ASTM C 336-71 entitled "Standard Test Method for Annealing Point and Strain Point of Glass by Fiber Elongation".
ASTM C 598-93 entitled "Standard Test Method for Annealing Point and Strain Point of Glass by Beam Bending".
ASTM C 1211-02 entitled "Standard Test Method for Flexural Strength of Advanced Ceramics at Elevated Temperatures".
ASTM C1291-00a (2010) entitled Standard Test Method for Elevated Temperature Tensile Creep Strain, Creep Strain Rate and Creep Time-to-Failure for Adv. Monolithic Ceramics.
ASTM C 1368-06 "Std. Test Method for Determination of Slow Crack Growth Parameters of Adv. Ceramics by Constant Stress-Rate Flexural Testing at Ambient Temperature".
ASTM C 1465-08 "Standard Test Method for Determination of Slow Crack Growth Parameters of Advanced Ceramics by Constant Stress-rate Flexural Testing at Elevated Temperatures".
ASTM C 1495-07 entitled "Standard Test Method for Effect of Surface Grinding on Flexure Strength of Advanced Ceramics".
ASTM C 1576-05 "Std Test Method for Determination of Slow Crack Growth Parameters of Adv Ceramics by Constant Stress Flexural Testing (Stress Rupture) at Ambient Temperature".
Choi et al., "Static Fatigue in ceramic materials: influences of an intergranular glassy and fracture toughness," Journal of Materials Science, 28 (1993) 5931-5936.
Kingery et al. "Introduction to Ceramics", John Wiley & Sons (1976) p. 10.
Lin et al. "Static and Cyclic Fatigue of Alumina at High Temperatures," J. Am. Ceram. Soc., (1991) 74:1511-1518.
Lin et al. "Static and Cyclic Fatigue of Alumina at High Temperatures: II, Failure Analysis," J. Am. Ceram. Soc., (1992) 75:637-648.
Park et al., "Static and cyclic fatigue behaviour in alumina ceramics" Journal of Materials Science Letters 14 (1995) 1688-1690.
Park et al., "Prediction of Static Fatigue Life of Ceramics", Journal of Materials Science Letters 16 (1997) 1352-1353.
Ritter et al., "Statistical Reproducibility of the Dynamic and Static Fatigue Experiments", Ceramic Bulletin, 60:8, (1981) 798-806.
Saint-Gobain SEFPRO product specifications for A 1148 high alumina, 2007.
Varshneya, Arun K., "Flat Glass," Fundamentals of Inorganic Glasses, Academic Press, Inc., Boston, 1994, Chapter 20, Section 4.2., 534-540.
Webb et al. "R-curve and subcritical crack growth behavior at elevated temperatures in coarse grain alumina," Acta Mater, 44:6, (1996) 2259-2264.
Wiederhorn et al., "Stress Corrosion and Static Fatigue of Glass", Journal of the American Ceramic Society, vol. 53, No. 10, 1970, pp. 543-548.
Professional Translation of JP 11-246230.
Jan. 2, 2013 Office Action for U.S. Appl. No. 13/180,052 (7 pages).
Apr. 8, 2013 Office Action for U.S. Appl. No. 13/180,052 (12 pages).
Ketcham et al., U.S. Appl. No. 13/180,052 entitled "High Static Fatigue Alumina Isopipes," Aug. 22, 2014 Office Action, PTOL-90A and pp. 1-22.
Ketcham, et al., U.S. Appl. No. 13/180,052 entitled "High Static Fatigue Alumina Isopipes," Jan. 22, 2015 Office Action, PTOL-90A and pp. 1-19.
Ketcham, et al., U.S. Appl. No. 13/180,052 entitled "High Static Fatigue Alumina Isopipes," Sep. 27, 2013 Office Action, PTOL-90A and pp. 1-16.

* cited by examiner ained tin without generating unacceptable levels of tin-containing defects in the glass sheet, specifically, at the sheet's fusion line. The alumina isopipes disclosed herein are especially beneficial when used with tin-containing glasses that exhibit low tin solubility, e.g., glasses that have $(RO+R_2O)/Al_2O_3$ ratios between 0.9 and 1.1, where, in mole percent on an oxide basis, $(RO+R_2O)$ is the sum of the concentrations of the glass' alkaline earth and alkali metal oxides and $Al_2O_3$ is the glass' alumina concentration.

ALUMINA ISOPIPES FOR USE WITH TIN-CONTAINING GLASSES

CROSS-REFERENCE TO RELATED APPLICATION

This application claims the benefit of priority under 35 USC § 119(e) of U.S. Provisional application No. 61/363,445 filed Jul. 12, 2010, the contents of which in its entirety is hereby incorporated by reference.

FIELD

This disclosure relates to isopipes used in the production of sheet glass by the fusion process and, in particular, to alumina isopipes that can be used with glasses that contain tin without generating unacceptable levels of tin-containing defects in the glass sheet, specifically, at the sheet's fusion line. The alumina isopipes disclosed herein are especially beneficial when used with tin-containing glasses that exhibit low tin solubility, e.g., glasses that have $(RO+R_2O)/Al_2O_3$ ratios between 0.9 and 1.1, where, in mole percent on an oxide basis, $(RO+R_2O)$ is the sum of the concentrations of the glass' alkaline earth and alkali metal oxides and $Al_2O_3$ is the glass' alumina concentration.

Definitions

The word "isopipe" refers generically to a body having a configuration suitable for use as a glass forming structure in a fusion downdraw process, irrespective of the particular shape and construction of the body or whether formation of the body involves isopressing or not.

The word "glasses" refers to glasses and glass-ceramics.

The word "defect" refers to an onclusion or inclusion on or within a glass sheet that is large enough to affect the merchantability of the sheet to manufacturers of displays and/or mobile electronic devices, e.g., an onclusion or inclusion having a major dimension greater than or equal to 10 microns for display applications or 100 microns for cover glasses for portable electronic devices.

The phrases "alumina material" and "alumina refractory" are used interchangeably and refer to a refractory material which comprises one or more $Al_2O_3$ phases which in combination are at least 90 volume percent of the refractory material including the refractory material's porosity.

The phrase "alumina isopipe" refers to an isopipe that comprises an alumina material where the alumina material forms at least a part of at least one surface of the isopipe that comes into contact with molten glass during use of the isopipe.

The phrase "tin-containing glasses" refers to glasses which contain tin or tin oxide in solution and/or as a defect. The tin of the tin oxide can be in its +2 or +4 valence state, i.e., the tin oxide can be SnO or $SnO_2$.

The phrase "glass sheet's fusion line" refers to the interface between the two sheets of molten glass that flow down opposite sides of an isopipe and then fuse into a single sheet at the isopipe's root.

When numerical ranges are set forth in the specification or claims, the ranges include their end points.

BACKGROUND

A. The Fusion Process

The fusion process is one of the basic techniques used in the glass making art to produce sheet glass. See, for example, Varshneya, Arun K., "Flat Glass," Fundamentals of Inorganic Glasses, Academic Press, Inc., Boston, 1994, Chapter 20, Section 4.2., 534-540. Compared to other processes known in the art, e.g., the float and slot draw processes, the fusion process produces glass sheets whose surfaces have superior flatness and smoothness. As a result, the fusion process has become of particular importance in the production of the glass sheets used in the manufacture of various electronic devices. As just two examples, fusion-produced glass sheets have been used as substrates in the production of flat panel display devices, e.g., liquid crystal displays (LCDs), and as faceplates, e.g., touch screens, in mobile electronic devices.

The fusion process, specifically, the overflow downdraw fusion process, is the subject of commonly-assigned U.S. Pat. Nos. 3,338,696 and 3,682,609, to Stuart M. Dockerty, the contents of which are incorporated herein by reference. A schematic drawing of the process of these patents is shown in FIG. 1. As illustrated therein, the system includes a supply pipe 9 which provides molten glass to a collection trough 11 formed in a free-space spanning, refractory body 13 known as an "isopipe."

Once steady state operation has been achieved, molten glass passes from the supply pipe to the trough and then overflows the weirs (i.e., the tops of the trough on both sides), thus forming two sheets of glass that flow downward and inward along the outer surfaces of the isopipe. The two sheets meet at the bottom or root 15 of the isopipe, where they fuse together into a single sheet, e.g., a sheet having a thickness of ~700 microns. The single sheet is then fed to drawing equipment (represented schematically by arrows 17 in FIG. 1), which controls the thickness of the sheet by the rate at which the sheet is drawn away from the root.

As can be seen in FIG. 1, the outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and thus become the fusion line which is buried in the body of the final sheet. In this way, the superior properties of the outer surfaces of the final sheet are achieved.

B. Isopipe Requirements

As is evident from the foregoing, isopipe 13 is critical to the success of the fusion process as it makes direct contact with the glass during the forming process. Thus, the isopipe needs to fulfill strict mechanical and chemical requirements to have a lifetime that is not too short and to deliver a quality sheet glass product.

With regard to mechanical requirements, during use, a vertical temperature gradient is imposed on the isopipe to manage the viscosity of the molten glass being formed into the glass sheets. In particular, at the root of the isopipe, the glass viscosity typically needs to be in the range of approximately 100 to 300 kP, and to achieve this viscosity the vertical temperature gradient is, for example, on the order of 50-100° C. In addition to this steady-state temperature gradient, the isopipe must also be able to withstand transient gradients during heat-up, as well as during maintenance and repair operations, e.g., during replacement of one or more of the external heating elements used to maintain the pipe at its operating temperature.

In addition to the ability to withstand temperature gradients, an isopipe needs to have a substantially constant configuration at its use temperature. Dimensional stability is of great importance since changes in isopipe geometry affect the overall success of the fusion process. See, for example, Overman, U.S. Pat. No. 3,437,470, and Japanese Patent Publication No. 11-246230. Unfortunately, the conditions under which the isopipe is used make it susceptible to dimensional changes. Thus, the isopipe operates at elevated temperatures on the order of 1000° C. and above. Moreover, the isopipe operates at these elevated temperatures while supporting its own weight as well as the weight of the molten glass overflowing its sides and in trough 11, and at least some tensional force that is transferred back to the isopipe through the fused glass as it is being drawn.

Depending on the width of the glass sheets that are to be produced, the isopipe can have an unsupported length of two meters or more. Current business trends are towards ever larger glass sheets requiring ever larger isopipes for their formation. For an isopipe span on the order of 13 feet, the weight of an isopipe made from zircon (see below) is estimated to be in excess of 15,000 pounds. Moreover, analysis shows that the rate of isopipe sag due to creep (see below) is proportionate to its length raised to the fourth power and inversely proportionate to the square of its height. Accordingly, a doubling in the length of the isopipe (with the same life requirement and temperature capability) requires either a 16 fold decrease in intrinsic creep rate or a four fold increase in height.

In addition to the foregoing mechanical requirements, the isopipe has to meet stringent chemical requirements. In particular, the isopipe should not be rapidly attacked by or be the source of defects in the glass. In terms of commercial production, the defect levels in glass sheets produced by the fusion process have to be extremely low, e.g., on the order of 0.01 defects/pound and below. As the size of the glass sheets has increased, meeting these low defect levels has become ever more challenging, making the need for a chemically stable isopipe even more important.

C. Isopipe Materials

To withstand the above demanding conditions, isopipes 13 have been manufactured from isostatically pressed blocks of refractory material. In particular, isostatically-pressed zircon refractories, such as those sold by St. Gobain-SEF-PRO of Louisville, Ky., have been used to form isopipes for the fusion process.

In recent years, efforts have been made to improve the mechanical properties of zircon isopipes. In particular, the creep properties of zircon isopipes have been the subject of intensive research. See, for example, commonly-assigned U.S. Pat. No. 6,974,786 to Helfinstine et al. and PCT Patent Publication No. WO 2006/073841 to Tanner et al., the contents of both of which are incorporated herein by reference.

As known in the art, creep is the permanent change in the physical shape of a refractory or other material as a result of an imparted stress usually at elevated temperature. The creep acts in such a way as to relieve the stress, and is usually attributed to grain boundary sliding or material diffusion. Zircon suffers from creep because at high temperature it decomposes to silica liquid and zirconia, and the presence of silica liquid at grain boundaries increases the creep rate.

An isopipe undergoing creep sags in the middle and deforms the weirs over which the glass flows. When the weirs are no longer straight, the glass flow distribution across the length of the isopipe is disturbed and it becomes more difficult and eventually impossible to manage glass sheet formation, thus ending production. Thus, even though zircon is considered to be a high performance refractory material, in practice, isopipes composed of commercially available zircon exhibit dimensional changes which limit their useful life.

In addition to creep, as disclosed in commonly-assigned U.S. Provisional Application No. 61/363,445 filed on Jul. 12, 2010 and entitled "High Static Fatigue Alumina Isopipes" (hereinafter referred to as the "'445 application"), static fatigue is also a critical property of isopipe materials, both with regard to isopipes in general and alumina isopipes in particular. As indicated above, the present application claims priority from the '445 application and its contents are incorporated herein by reference in their entirety.

As to chemical stability, zircon is known to dissolve into alkali-free glasses (e.g., LCD glasses) at the hotter regions near the weirs of the isopipe and then precipitate in the cooler regions near the root to form secondary zircon crystals. These crystals can be sheared off by the glass flow and become inclusions in the sheet. Secondary crystals incorporated into the drawn glass are visual defects, and finished LCD panels with such defects are rejected. As disclosed in commonly-assigned U.S. Patent Publication No. 2003/0121287, published Jul. 3, 2003, the contents of which are incorporated herein by reference, secondary zircon precipitation can be controlled by restricting the weir-root temperature difference to less than about 100° C.

In accordance with the '445 application, it has been discovered that although zircon isopipes can be used with some alkali-containing glasses, they are incompatible with others. In particular, zircon can develop a blocky morphology and a surface layer composed of zirconia and having a "fish-egg" appearance when exposed to glasses having high levels of alkali (i.e., glasses wherein, on an oxide basis, the sum of $Na_2O$, $K_2O$, and $Li_2O$ is greater than or equal to 10 weight percent; hereinafter referred to as "high alkali glasses"). The inability to use zircon isopipes with high alkali glasses is a serious deficiency since the glasses are particularly useful in applications requiring chip and scratch resistant glass surfaces, e.g., touch screens, watch crystals, cover plates, solar concentrators, windows, screens, containers, and the like. See, for example, commonly-assigned U.S. Pat. No. 7,666,511, U.S. Patent Publication No. US 2009/0215607, and U.S. application Ser. No. 12/542,946, filed Aug. 18, 2009, the contents of all of which are incorporated herein by reference.

In addition to zircon, isopipes have also been made of alumina. See, for example, commonly-assigned U.S. Pat. No. 4,018,965, the contents of which are incorporated herein by reference. In particular, besides its zircon refractories, St. Gobain-SEFPRO of Louisville, Ky., has also sold alumina refractories for use as isopipes, specifically, its A1148 alumina refractory.

At first blush, A1148 would appear to be a better material than zircon for use in isopipes since it has a lower creep rate, and in the early days of the fusion process, A1148 was the material of choice. In those days, the isopipes were typically composed of two pieces, i.e., a top portion containing the trough and a lower portion containing the sloping sides, and were generally shorter than modern isopipes. Also, the forming temperatures of the glasses being produced in the early days were lower than those used today, e.g., early applications of the fusion process involved glasses having forming temperatures around 1000° C. or less, e.g., 800-1000° C., while today's glasses are formed on fusion draws at temperatures as high as 1300° C., with 1200-1230° C. being typical. Under the conditions that prevailed in the past, A1148 performed successfully and was routinely used.

However, over time and, in particular, in connection with the growth in popularity of the fusion process as a preferred method for making alkali-free glass substrates for display applications, alumina was phased out and replaced with zircon. Today, most of the display substrates made by the fusion process are made with zircon isopipes. But, as noted above, zircon isopipes are chemically-incompatible with the high alkali glasses which are becoming dominant in the personal (portable) electronics field.

Moreover, as discussed in the '445 application, although historically A1148 alumina was usable as an isopipe material, under modern conditions, A1148 alumina is a poor material and, indeed, is potentially dangerous. Specifically, in accordance with the recognition that static fatigue is a critical parameter for a candidate isopipe material, the static fatigue of A1148 alumina was determined in the '445 application and used to calculate times-to-failure for A1148 under conditions representative of those encountered during the use of an isopipe. That analysis showed that A1148 will fail during use and, in particular, will fail under conditions that cannot be avoided, e.g., during maintenance and repair of the heating elements employed to heat an isopipe. Such a failure can literally cause the isopipe to break into parts thus endangering portions of a fusion machine lying below the isopipe, as well as personnel working in the vicinity of the machine.

D. The Use of Tin in Glass Manufacturing by the Fusion Process

Tin is a common component of glasses made by the fusion process. For many years, tin electrodes have been used to electrically heat molten glass and as the electrodes wear, tin is introduced into the glass. More recently, tin has become a batch component of glasses made by the fusion process. Specifically, in the effort to make "green" glasses, the fining agents arsenic and antimony have been reduced and/or removed from fusion glass and replaced by tin. See commonly-assigned U.S. Pat. Nos. 7,851,394 and 7,534,734.

Accordingly, the formation of tin-containing defects in fusion glasses is a serious problem since to remove tin from the glass would require the development of new electrical heating systems and would eliminate tin as a fining agent for green glasses. As discussed fully below, it has been surprisingly found that alumina isopipes can be a source of tin-containing defects in fusion glasses even when the isopipes have a low tin content which in and of itself would not be expected to lead to tin-containing defects. The mechanism underlying this anomalous behavior is presented below, as well as techniques for ensuring that the tin-containing defect level in fusion glasses is kept within acceptable limits.

SUMMARY

In accordance with a first aspect, a method is disclosed for making glass sheets using a fusion process which includes:

(a) forming molten glass into a glass ribbon using an isopipe; and (b) separating glass sheets from the glass ribbon;

wherein:

(i) the isopipe includes an alumina refractory that forms at least a part of at least one surface of the isopipe which comes into contact with the molten glass during the formation of the ribbon;

(ii) the minimum temperature of molten glass which contacts the isopipe's alumina refractory during the formation of the glass ribbon is $T_{min}$;

(iii) the molten glass has a tin solubility $S_{tin}$ at $T_{min}$;

(iv) the concentration of tin $C_{tin}$ in the molten glass satisfies the relationship:

$$C_{tin} \geq 0.5 S_{tin};$$

(v) the tin concentration in the alumina refractory on an oxide basis is less than or equal to 1.0 weight percent; and (vi) the sum of the titanium, zirconium, and hafnium concentrations in the alumina refractory on an oxide basis is less than or equal to 1.5 weight percent.

In accordance with a second aspect, a method is disclosed for reducing fusion line tin-containing defects in glass sheets produced by a fusion process, the fusion process employing an isopipe that includes a first alumina refractory that forms at least a part of at least one surface of the isopipe which comes into contact with molten glass during the fusion process, the method including:

(a) determining a concentration in the first alumina refractory of a first element from Group IVB of the periodic chart;

(b) forming an isopipe using a second alumina refractory having a concentration of the first element that is less than the concentration determined in step (a), the second alumina refractory forming at least a part of at least one surface of the isopipe which comes into contact with molten glass during the fusion process; and (c) using the isopipe of step (b) to make glass sheets by a fusion process.

In accordance with a third aspect, an isopipe is disclosed that includes a body having a configuration adapted for use in a fusion process, the body including an alumina refractory that forms at least a part of at least one surface of the isopipe which comes into contact with molten glass during use of the isopipe, wherein:

(i) the tin concentration in the alumina refractory on an oxide basis is less than or equal to 1.0 weight percent; and (ii) the sum of the titanium, zirconium, and hafnium concentrations in the alumina refractory on an oxide basis is less than or equal to 1.5 weight percent.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that both the foregoing general description and the following detailed description are merely exemplary of the invention and are intended to provide an overview or framework for understanding the nature and character of the invention. It is also to be understood that the various features of the invention disclosed in this specification and in the drawings can be used in any and all combinations.

DETAILED DESCRIPTION

Figure 1:
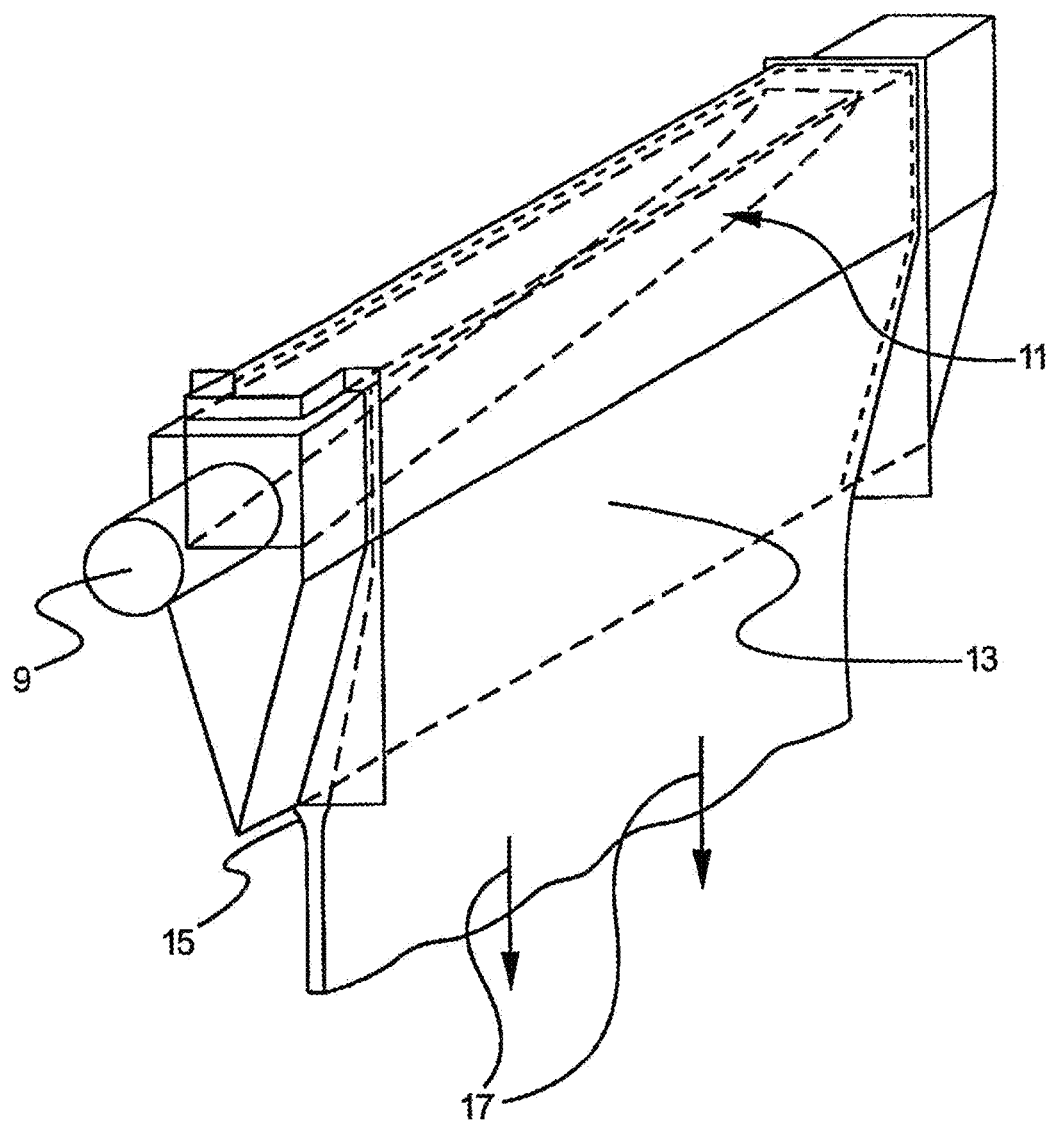
FIG. 1 is a schematic drawing illustrating a representative construction for an isopipe for use in an overflow downdraw fusion process for making flat glass sheets. This drawing is not intended to indicate scale or relative proportions of the elements shown therein.

This disclosure addresses the problem of tin-containing defects in glass sheets produced using alumina isopipes. As discussed in detail below, in accordance with the disclosure, it has been discovered that an alumina isopipe can produce tin-containing defects in glass sheets, specifically, along the sheet's fusion line, as a result of the presence of elements of Group IVB of the periodic chart (i.e., Ti, Zr, and Hf) in the isopipe's alumina material. (Group IVB of the periodic chart also includes rutherfordium (Rf), but this a synthetic element that is not stable.)

The disclosure provides alumina isopipe compositions and isopipes made from those compositions that do not promote cassiterite ($SnO_2$) precipitation in glasses made by the fusion process. The alumina compositions do not contain significant amounts of $TiO_2$, $ZrO_2$, $HfO_2$ or $SnO_2$, i.e., the sum of the $TiO_2$, $ZrO_2$, and $HfO_2$ contents is less than or equal to 1.5 wt. % (e.g., in certain embodiments, less than or equal to 1.0 wt. %, and in other embodiments, less than or equal to 0.5 wt. %), and the $SnO_2$ content is less than or equal to 1.0 wt. % (e.g., in certain embodiments, less than or equal to 0.5 wt. %, and in other embodiments, less than or equal to 0.25 wt. %). In certain embodiments, in addition to their sum being less than or equal to 1.5 wt. %, the individual contents of the Group IVB elements present in the alumina isopipe compositions of this disclosure satisfy the following limitations: $TiO_2$ less than or equal to 1.5 wt. % (e.g., in certain embodiments, less than or equal to 1.0 wt. %, and in other embodiments, less than or equal to 0.5 wt. %); $ZrO_2$ less than or equal to 1.0 wt. % (e.g., in certain embodiments, less than or equal to 0.5 wt. %, and in other embodiments, less than or equal to 0.25 wt. %); and $HfO_2$ less than or equal to 1.0 wt. % (e.g., in certain embodiments, less than or equal to 0.5 wt. %, and in other embodiments, less than or equal to 0.25 wt. %).

The presence of $TiO_2$, $ZrO_2$, and/or $HfO_2$ in an alumina based isopipe can significantly lower the $SnO_2$ solubility in molten glass being formed into sheets using the isopipe. When present in significant amounts in the isopipe, $TiO_2$, $ZrO_2$ and/or $HfO_2$ dissolve into the glass flowing over the isopipe and lower the solubility limit of $SnO_2$ in the glass (e.g., $SnO_2$ used as a fining agent and/or $SnO_2$ present due to the use of $SnO_2$ electrodes to heat the glass). Depending upon temperature, the solubility limit of $SnO_2$ in the glass can be lowered enough that $SnO_2$ needles (with $TiO_2$ and/or $ZrO_2$ solid solutions) precipitate in the glass and on the isopipe.

The presence of $SnO_2$ in an alumina based isopipe can cause the glass flowing over the isopipe trough and weir to become saturated with $SnO_2$, i.e., the glass' diffusion boundary layer will acquire a $SnO_2$ level corresponding to the $SnO_2$ solubility at the temperature of the glass in the trough and weir region of the isopipe. When the temperature decreases along the surface of the isopipe, cooling as the glass approaches the root of the isopipe, the solubility limit of the $SnO_2$ will decrease causing part of the $SnO_2$ to precipitate and form defects. In addition to their effect on tin defects, $TiO_2$, $ZrO_2$, and $HfO_2$ can behave similarly in that if present in an alumina based isopipe, they can saturate molten glass at the higher temperatures of the trough/weir portion of the isopipe and then precipitate at the cooler temperatures of the root portion. Indeed, solid solutions of $TiO_2$, $ZrO_2$, $HfO_2$, and/or $SnO_2$ can precipitate if one or more of these oxides is present at its solubility limit.

Figure 2:
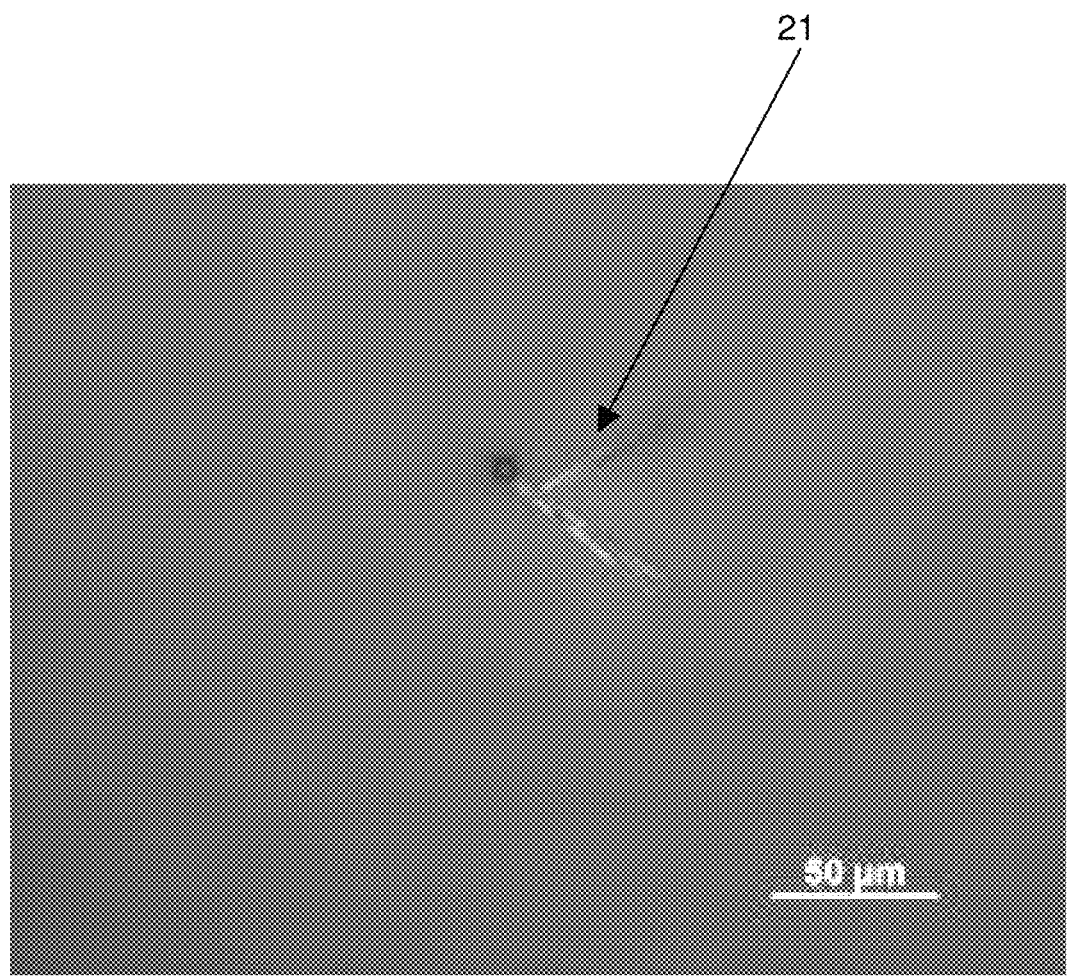
FIG. 2 shows an example of a cassiterite defect as seen by optical microscopy.
Figure 3:
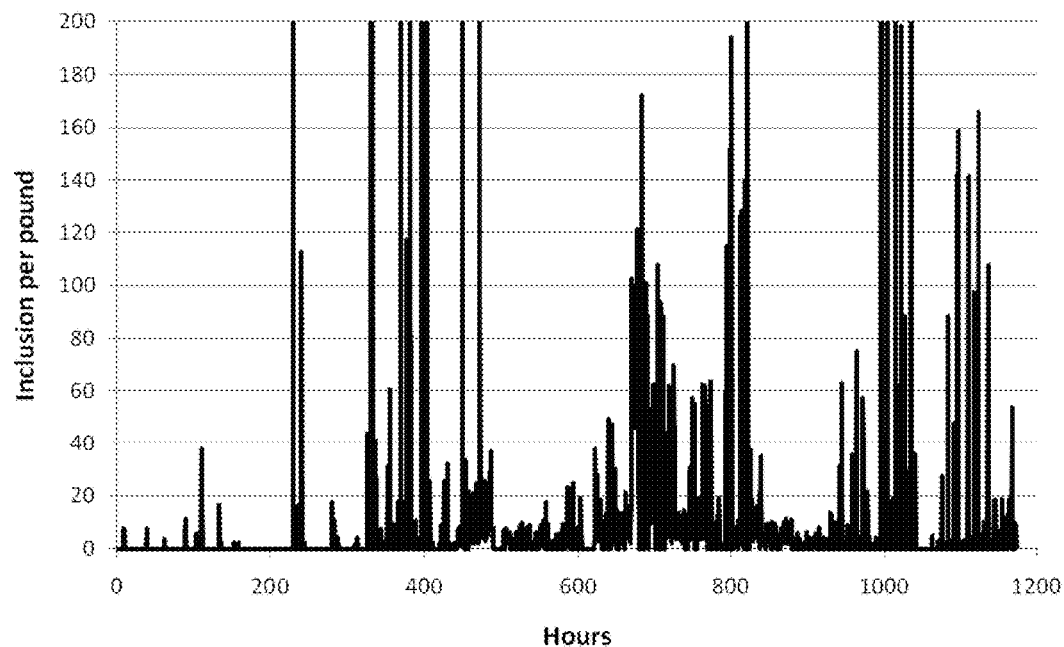
FIG. 3 is a plot of the number of cassiterite defects per pound of glass (vertical axis) observed during a multi-week trial. The horizontal axis shows the time in hours from the beginning of the trial at which the defect level was determined. Only defects smaller than 50 microns in size are plotted in this figure.

The problem of tin defects caused by alumina isopipes was discovered in connection with the production of glass sheets using an isopipe composed of A1148 alumina. The glass being formed had the composition set forth in Table 1. Unexpectedly, significant numbers of cassiterite ($SnO_2$) crystals were found along the sheet's fusion line. Example 1 below details the experimental protocol used to document the high level of tin-containing defects produced by an A1148 alumina isopipe. FIG. 2 shows a representative cassiterite crystal 21 found in this experiment, while FIG. 3 shows the levels of defects observed over a multi-week period of continuous operation.

The A1148 alumina used in the experiment of Example 1 was essentially free of tin (see Example 5 below). Accordingly, the production of tin defects by this isopipe was anomalous since the isopipe itself could not have been the source of the defects. One solution to the problem would have been to remove tin from the glass being processed on the isopipe. However, as discussed above, this would have meant eliminating tin electrodes from the system used to electrically heat the glass, as well as eliminating tin as a fining agent from the glass being processed, both of which would be expensive, time consuming, and generally undesirable.

The breakthrough in solving this problem without taking the drastic step of removing tin from the glass came in the form of the conception of a mechanism (hereinafter referred to as the "competition mechanism") for the formation of the defects by the isopipe even though the isopipe did not include tin. In accordance with the competition mechanism, titanium and zirconium from the alumina isopipe, as well as hafnium which is normally present in any material which contains zirconium, enter the molten glass and force the tin out of solution. Although not wishing to be bound by any particular theory of operation, this mechanism is supported by the following. Tetravalent Ti, Zr, and Hf have ionic radii of 0.61, 0.72, and 0.71 Å, respectively. Because these ions have the same charge and their radii are similar to the ionic radius of $Sn^{4+}$ at 0.69 Å, they can compete for the same sites in glasses and crystals. If the 4+ sites are taken up by Ti, Zr, or Hf, then there are fewer sites available for $Sn^{4+}$ and it can crystallize out as the glass is cooled.

Based on the competition mechanism, the level of tin defects in glass sheets produced using an alumina isopipe is directly reducible by reducing the levels of Ti, Zr, and/or Hf in the isopipe. Low tin levels in the isopipe are also advantageous since adding more tin to a glass susceptible to tin precipitation will only exacerbate the tin defect problem, e.g., as described above, by saturating the glass with tin in the trough/weir region of the isopipe which can then precipitate out in the region of the root where the glass is cooler.

Figure 4:
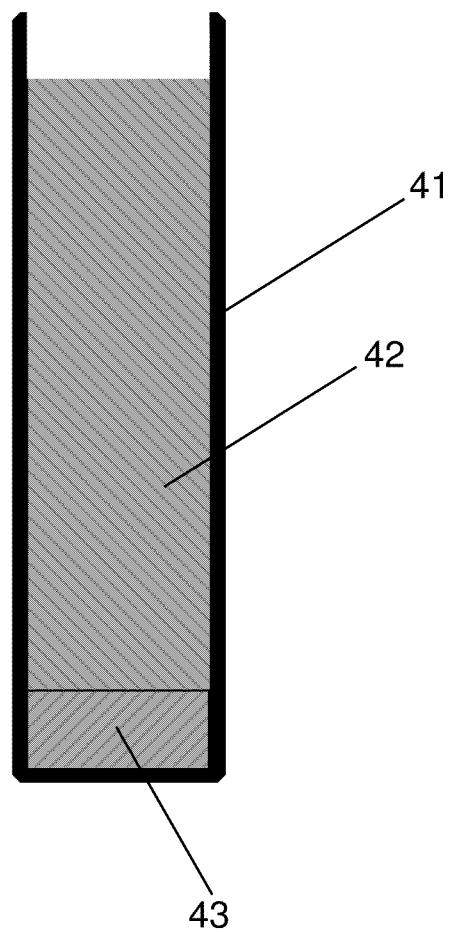
FIG. 4 is a schematic drawing illustrating a Pt pouch of the type used in the quenched solubility test of Examples 2-4.

The experiments of Examples 2-4 below confirm the competition mechanism. In particular, these experiments show that the introduction of titanium and zirconium into molten glass can lower the glass' tin solubility. The equipment used in the experiments of these examples is shown in FIG. 4 where 41 is a pouch formed of platinum foil, 42 is a sample of the glass of Table 1, and 43 is a test composition, i.e., a mixture of alumina (corundum) and tin (cassiterite) crystals in Example 2, a mixture of alumina (corundum), tin (cassiterite), and $TiO_2$ crystals in Example 3, and a mixture of alumina (corundum), tin (cassiterite), and $ZrO_2$ crystals in Example 4.

The pouch with its charge was heated and held at an elevated temperature to allow molten glass to flow down into, and then interact with, the test composition. Composition measurements were then made on cooled samples both at the top of the sample where the glass had not interacted with the test composition and within the body of the test composition at locations spaced from the crystals of the test composition. The overall results are shown in Table 2, while Table 3 specifically shows the tin concentrations for the experiments at the two measurement locations (top of the glass and within the body of the test composition).

As shown in the "Corundum+Cassiterite+Table 1 Glass" row of Table 3, the presence of alumina crystals did not substantially change the tin concentration in the glass, i.e., the presence of alumina did not cause the tin to precipitate. This is an important result because it shows that it is not the alumina per se that is the source of the anomalous tin defects.

As shown by the "Corundum+Cassiterite+$TiO_2$+Table 1 Glass" row of Table 3, the addition of $TiO_2$ crystals to the test composition substantially changed (reduced) the tin concentration in the glass. Thus, the tin concentration in the glass phase dropped from 0.27 for the measurement made at the top of the sample to 0.17 for the measurement made within the body of the test composition, i.e., by 37%, as a result of the presence of titanium in the glass. That is, the titanium caused the tin to precipitate into a crystalline phase and thus its concentration in the glass phase dropped. The "Corundum+Cassiterite+$ZrO_2$+Table 1 Glass" row of Table 3 show that the addition of $ZrO_2$ crystals causes substantially the same effect as $TiO_2$ crystals, i.e., the tin concentration in the glass phase dropped by 25% as a result of the presence of zirconium in the glass. Although not tested, substantially the same results will occur for hafnium.

Examples 3-4 thus demonstrate that titanium and zirconium (and, by implication, hafnium) in an alumina isopipe can generate tin-containing defects in a glass that comes into contact with the isopipe. To complete the story, Example 5 reports the results of an analysis performed on A1148 alumina to determine its composition. As shown therein, A1148 contains substantial amounts of titanium and zirconium. Examples 1-5 thus demonstrate that the anomalous tin-containing defects found along the fusion lines of the glass sheets produced in Example 1 are not the result of the use of alumina per se as the isopipe material, but rather are the result of the presence of Group IVB elements in the alumina material, which elements entered the molten glass and displaced tin atoms causing them to form tin crystals of the type shown in FIG. 2.

This problem of tin defects caused by Group IVB elements present in an alumina isopipe may be encountered in any glass where the tin concentration $C_{tin}$ is near its solubility limit $S_{tin}$ in the glass, i.e., where $C_{tin} \geq 0.5 \, S_{tin}$ (e.g., in certain embodiments, where $C_{tin} \geq 0.7 \, S_{tin}$, and in other embodiments, where $C_{tin} \geq 0.9 \, S_{tin}$). In general terms, tin solubility decreases with decreasing temperature. Hence, the critical tin solubility is that at the minimum temperature the molten glass will experience when passing over the isopipe ($T_{min}$). Typically, $T_{min}$ will occur at the root of the isopipe. As known in the art, the temperature profile of glass flowing over an isopipe can be readily determined using, for example, thermocouples and/or infrared measurements. Similarly, routine experimentation can be used to determine a tin solubility versus temperature curve for a given glass composition. For example, tin solubility as a function of temperature for any particular glass composition can be determined using a procedure of the type employed in Example 2 performed at a series of equilibration temperatures. Using $T_{min}$, the tin solubility curve, and the expected maximum tin concentration in a particular glass, an appropriate alumina isopipe material for the particular glass can be readily selected by the skilled person based on the present disclosure. Alternatively, an alumina isopipe material suitable for the most difficult cases (i.e., the glass composition/processing temperature combinations most likely to lead to tin defects) can be selected and used generally for both susceptible and non-susceptible glasses.

Glasses that are particularly susceptible to the problem of tin defects are those that have $(RO+R_2O)/Al_2O_3$ ratios in the 0.9 to 1.1 range (e.g., in the 0.95 to 1.06 range), where, in mole percent on an oxide basis, $(RO+R_2O)$ is the sum of the concentrations of the glass' alkaline earth and alkali metal oxides and $Al_2O_3$ is the glass' alumina concentration. Glasses having $(RO+R_2O)/Al_2O_3$ ratios in the 0.9 to 1.1 range tend to have a low tin solubility (e.g., a tin solubility less than or equal to 0.4 wt. % $SnO_2$) and thus are often right at the edge of defect formation based on the tin used for fining and that introduced through electrical heating with tin electrodes. Accordingly, for these types of glasses, even small amounts of Group IVB elements from an alumina isopipe or small amounts of tin in the isopipe material can push the glass over the edge so that high levels of defects, e.g., defect levels like those of FIG. 3, will appear in the glass.

Other than their contents of tin and Group IVB elements, the alumina materials of the isopipes disclosed herein can have a variety of compositions. For example, the materials can have compositions of the type disclosed in the '445 application. More generally, as set forth above in the definitions, the alumina material will contain at least 90 volume percent alumina phases (e.g., in certain embodiments, at least 95 volume percent alumina phases, and in other embodiments, at least 98 volume percent alumina phases). In addition, the alumina material will generally include a glass phase, e.g., a glass phase composed of alkali or alkaline earth aluminosilicates which on a volume percent basis may constitute less than or equal to 5 volume percent of the alumina material (in certain embodiments, less than or equal to 2 volume percent of the alumina material). When excessive amounts of oxides (above 10 mole %) of alkali metals (Group IA) are present in alumina bodies, in conjunction with silica, low viscosity glasses can form. Low viscosity glasses can impair high temperature mechanical properties to the point that an isopipe can sag out of shape during use or the isopipe can crack by slow crack growth assisted by grain sliding and cavitation. The greater the amount of porosity, the greater is the propensity for cavitation and grain boundary sliding. Larger amounts of low viscosity glass can actually allow some fine grain ceramics to deform super-plastically. Large amounts of group IA elements/oxides greater than 10 mole % should thus be avoided. Other components of the alumina material may include Group IIA elements/oxides and/or rare earth elements/oxides which can each create phases which serve as grain growth inhibitors and thus facilitate sintering. In addition to their low levels of tin and Group IVB elements, in certain embodiments, the alumina materials will also have low levels of elements and/or their oxides that could color the glass (e.g., Fe, Ni, Co, and Cr), as well as low levels of toxic or hazardous elements and/or their oxides (e.g., As, Sb, Hg, and Pb).

Isopipes can be manufactured from the low $SnO_2$/low Group IVB alumina materials disclosed herein using a variety of manufacturing techniques now known or subsequently developed in the art. For example, manufacturing techniques of the type disclosed in the '445 application can be used. In many cases, cold iso-pressing to form a green body using pressures from below 5 KPSI to higher than 40 KPSI followed by sintering at between about 1150° C. to over 1750° C. in air for 30 minutes to weeks will provide a refractory block (e.g., a block having a length greater than 2.0 meters) suitable for subsequent machining into an isopipe configuration (e.g., a configuration of the type shown in FIG. 1). Other techniques can, of course, be used if desired.

EXAMPLES

The following non-limiting examples further illustrate the alumina materials disclosed herein, as well as various of the problems with the existing A1148 alumina material.

Example 1

This example demonstrates the formation of tin-containing defects along the fusion line of glass sheets produced using an isopipe composed of A1148 alumina.

An isopipe sized for a small research melting operation was machined out of a block of A1148 alumina. The isopipe's configuration was substantially as shown in FIG. 1. Over a multi-week period, small width sheets of an alkali-containing glass having the composition shown in Table 1 were formed by a downdraw fusion process with an isopipe trough temperature of approximately 1215° C. and an isopipe root temperature of approximately 1110° C. The Table 1 glass was nearly saturated with batched $SnO_2$ for fining and a small amount of $SnO_2$ from corrosion of the $SnO_2$ electrodes used to pass current through the glass for Joule heating during melting of the glass.

FIG. 2 is a photomicrograph taken with an optical microscope of a representative cassiterite defect formed along the fusion line of one of the glass sheets produced by the process. FIG. 3 shows the number of cassiterite defects found in the glass sheets per pound as a function of time. In particular, this figure shows the number of defects per pound for defects smaller than 50 microns. Most of these defects were found along the fusion line and came from interaction of the glass with the isopipe material. As shown in FIG. 3, the number of these defects was in many cases more than 100 defects/pound. Tin-containing defects larger than 50 microns were also present in the body (inclusions) and on the surface (onclusions) of the glass sheets and were traced to tin condensation upstream of the isopipe.

This long-term experiment shows that the prior art A1148 alumina isopipe material forms cassiterite defects in $SnO_2$-containing glasses and particularly in $SnO_2$ and alkali containing glasses.

Example 2

The equilibrium solubility of $SnO_2$ in the glass of Table 1 in the presence of cassiterite ($SnO_2$) and corundum ($Al_2O_3$) crystals was determined as follows.

A pouch was formed out of Pt foil in the shape of a stack of glass slides cut from glass sheets that had the composition of Table 1 and were produced on commercial fusion draw equipment by Corning Incorporated, the assignee of this application. The Pt was cleaned in HCl and rinsed thoroughly. Several grams each of cassiterite and corundum powders were placed in the bottom of the Pt pouch and then the stack of glass slides was slid into the pouch over the powders. The entire charge was heated to 1400° C. in air for 24 hours to dissolve some of the crystals at the bottom of the pouch and then cooled to 1110° C. and allowed to equilibrate for 120 hours. The sample was quenched to room temperature and then sectioned and prepared for analysis by electron microprobe (EPMA).

The glass near the top of the pouch (away from the Pt) was analyzed in order to check for loss of volatile elements. The glass at the bottom of the pouch between crystals separated by no more than 30 microns was then analyzed to ensure that diffusive equilibration had occurred. Care was taken to analyze glass in the middle of the charge away from the Pt foil pouch. These analyses were performed using a 20 nA electron beam defocused to a 20 um spot. $K_2O$ was assigned a "fixed" value in the EPMA software and boron was calculated by difference. Electron beam conditions were selected so that alkali loss during exposure to the beam was negligible.

The results of this experiment are shown in Tables 2 and 3. As discussed above, this data shows that the presence of the alumina crystals did not substantially change the tin concentration in the glass. In addition, the data demonstrates that the level of $SnO_2$ used in Example 1 was below the solubility limit of the glass indicating that the A1148 isopipe was responsible for the cassiterite defects.

Example 3

The equilibrium solubility of $SnO_2$, $TiO_2$ and $Al_2O_3$ in the glass of Table 1 was determined in the presence of $SnO_2$—, $TiO_2$—, and $Al_2O_3$-bearing phases. The same protocol and analysis techniques were used as in Example 2 except that the powder placed at the bottom of the Pt pouch contained $TiO_2$ crystals in addition to cassiterite and corundum crystals. Crystalline phases were analyzed using a focused electron beam.

Figure 5:
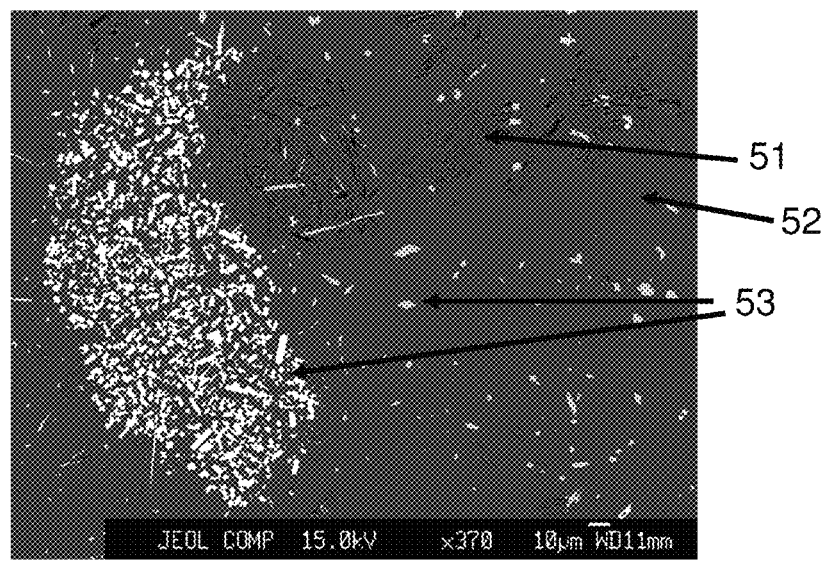
FIG. 5 is an SEM picture showing alumina, $TiO_2$, and $SnO_2$ crystals and the location where an EPMA analysis was performed on material from the bottom of a Pt pouch (see Example 3 below).
Figure 6:
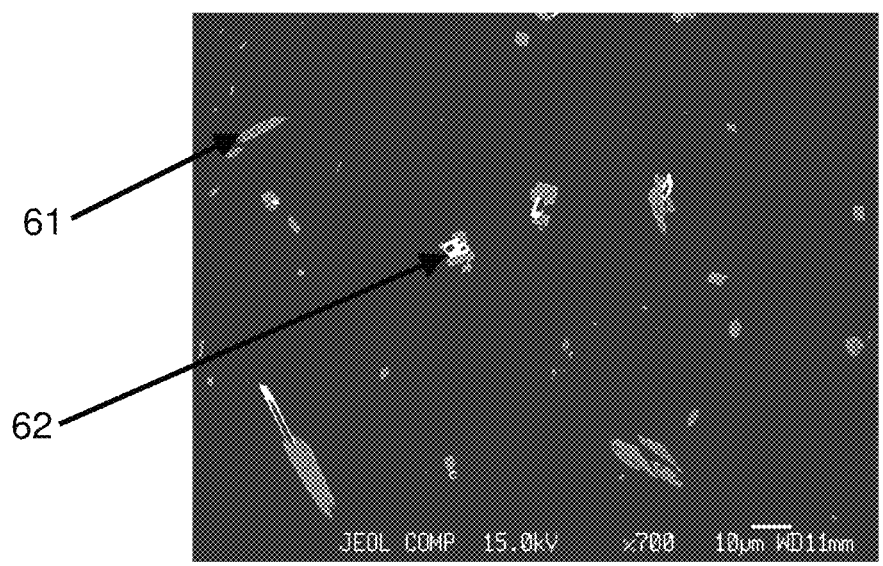
FIG. 6 is an SEM picture showing $TiO_2$ and $SnO_2$ crystals in material at the bottom of a Pt pouch (see Example 3 below).

The results of the glass analyses are shown in Tables 2 and 3. The resulting textures are shown in FIG. 5 where 51 shows a corundum crystal, 53 shows $TiO_2$ and cassiterite crystals, and 52 is an EPMA scar. The crystalline compositions in weight percent at locations 61 and 62 of FIG. 6 are shown in Tables 4 and 5, respectively. As these figures and tables show, three different solid phases were present at the bottom of the pouch: (1) corundum; (2) a high $TiO_2$ phase containing approximately 18 wt. % $SnO_2$; and (3) a high $SnO_2$ phase containing approximately 4 wt. % $TiO_2$. The latter two phases illustrate that there was significant solid solution between $SnO_2$ and $TiO_2$ in the solid phases at the bottom of the pouch.

As discussed above, this experiment demonstrates that the presence of $TiO_2$ lowers the equilibrium solubility of $SnO_2$ in the glass, specifically, in this experiment, from 0.27±0.01 wt. % in the $TiO_2$-free charge to 0.17±0.02 wt. % in the $TiO_2$-containing charge.

Example 4

The equilibrium solubility of $SnO_2$, $ZrO_2$ and $Al_2O_3$ in the glass of Table 1 was determined in the presence of $SnO_2$—, $ZrO_2$—, and $Al_2O_3$-bearing phases. The same protocol and analysis techniques were used as in Example 3 except that the powder placed at the bottom of the Pt pouch contained $ZrO_2$ crystals in place of the $TiO_2$ crystals.

Figure 7:
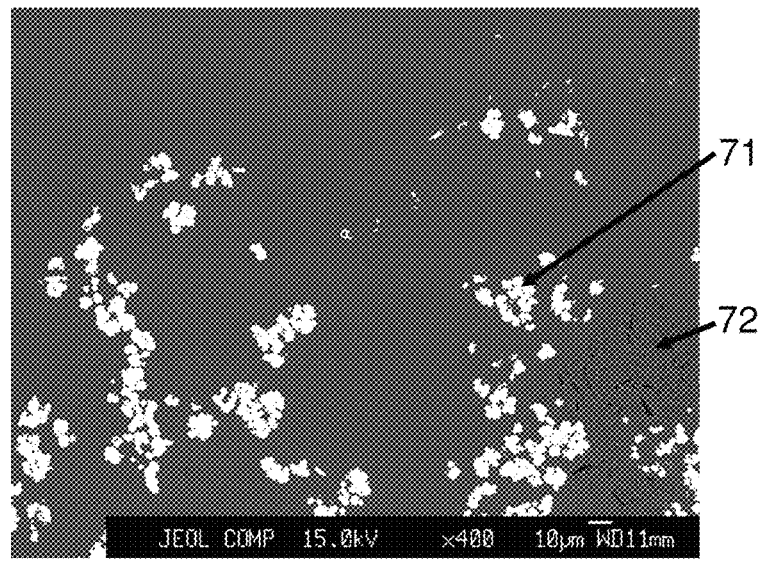
FIG. 7 is an SEM picture showing alumina, $ZrO_2$, and $SnO_2$ crystals in material at the bottom of a Pt pouch (see Example 4 below).
Figure 8:
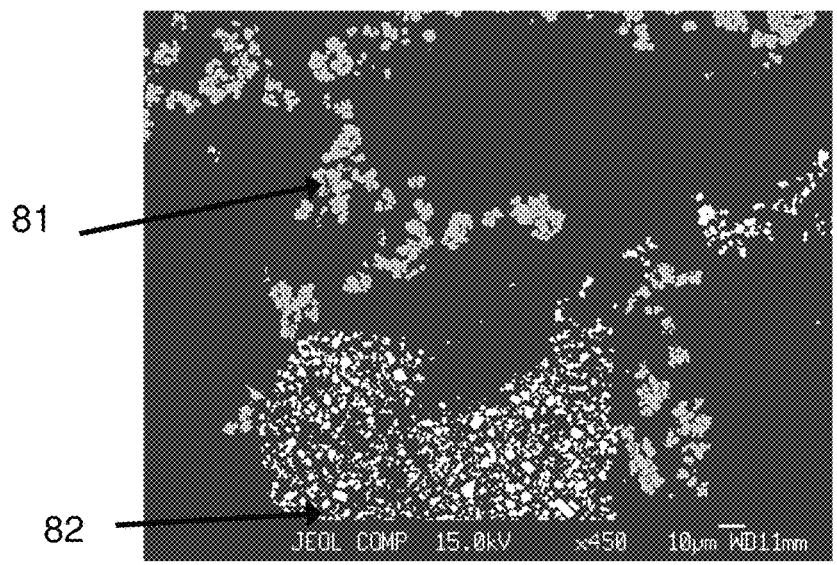
FIG. 8 is an SEM picture showing $ZrO_2$ and $SnO_2$ crystals in material at the bottom of a Pt pouch (see Example 4 below).

The results of the glass analyses are shown in Tables 2 and 3. The resulting textures are shown in FIG. 7 where 72 shows a corundum crystal and 71 shows $ZrO_2$ and cassiterite crystals. The crystalline compositions in weight percent at locations 81 and 82 of FIG. 8 are shown in Tables 6 and 7, respectively. As these figures and tables show, three different solid phases were present at the bottom of the pouch: (1) corundum; (2) a high $ZrO_2$ phase containing approximately 2 wt. % to approximately 10 wt. % $SnO_2$; and (3) a high $SnO_2$ phase containing approximately 3 to approximately 13 wt. % $ZrO_2$. The latter two phases illustrate that there was significant solid solution between $SnO_2$ and $ZrO_2$ in the solid phases at the bottom of the pouch.

As discussed above, this experiment demonstrates that the presence of $ZrO_2$ lowers the equilibrium solubility of $SnO_2$ in the glass, specifically, in this experiment, from 0.24±0.02 wt. % in the $ZrO_2$-free charge to 0.18±0.02 wt. % in the $ZrO_2$-containing charge.

Example 5

Figure 9:
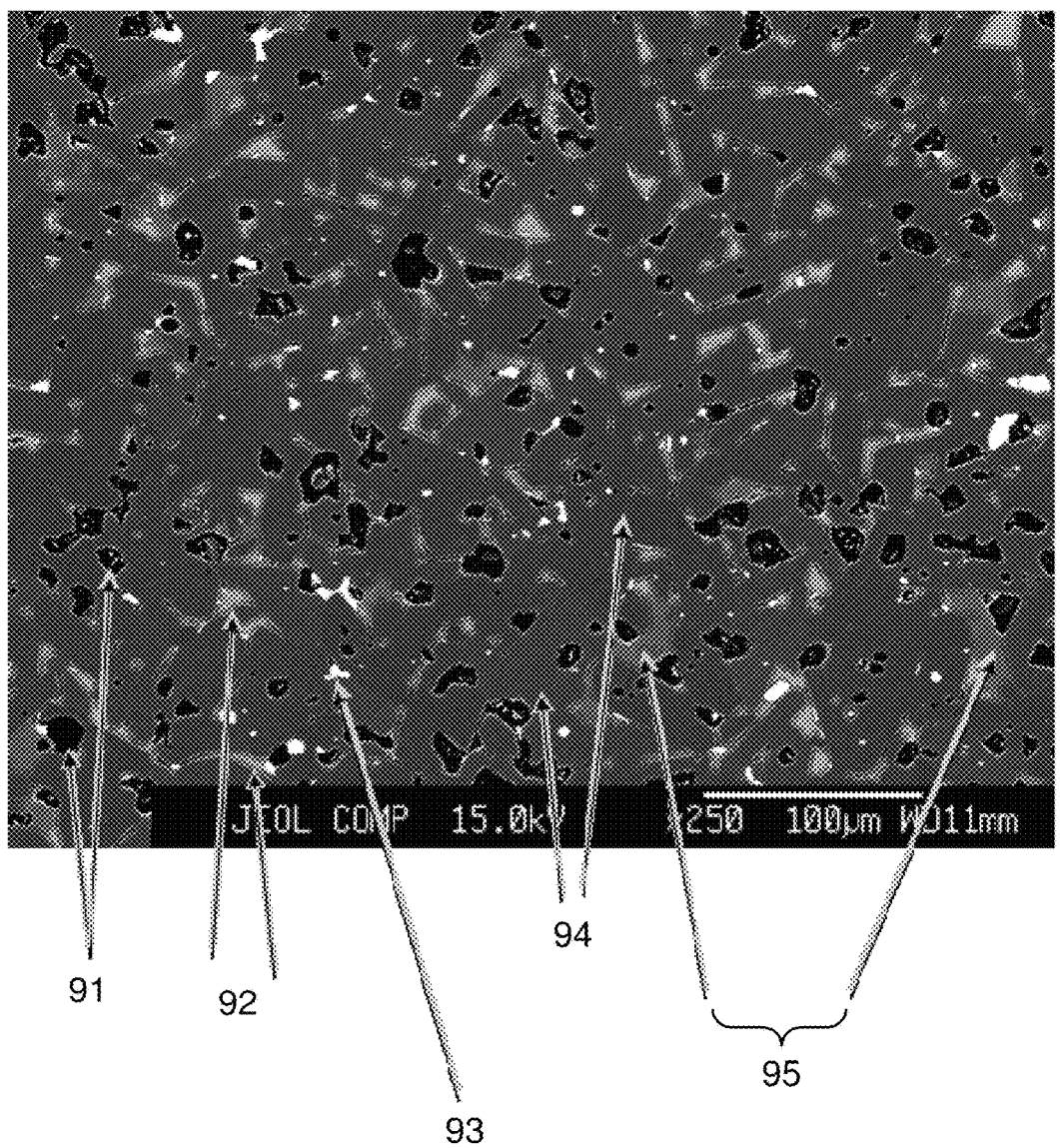
FIG. 9 is an SEM image of A1148 alumina.

A1148 isopipe material was analyzed for composition, phases, and porosity. FIG. 9 is a SEM backscatter electron image showing the overall structure of A1148, including its pores 91 (black in FIG. 9), its $Al_2O_3$ phase 94 (dark gray in FIG. 9), its mullite phase 95 (medium gray in FIG. 9), its glass phase 92 (light gray in FIG. 9), and its Zr—Ti—Al oxide phases 93 (white in FIG. 9).

Table 8 quantifies the A1148 phases in terms of their areas in SEM images. These area values correspond directly to volume percents. As can be seen in this table, $TiO_2$, $ZrO_2$ containing phases are present as well as significant porosity, mullite and an alkali alumino silicate glass. Note that there is 1.4-1.5 vol. % Zr, Ti, Al oxides in A1148. Tables 9 and 10 set forth the results of an electron microprobe (EMPA) analysis of the glass phase of the A1148 alumina, the values of Table 9 being in weight percent and those of Table 10 in mole percent. As shown therein, the glass contains 1.6 mole % $TiO_2$ and 0.26 mole % $ZrO_2$, as measured by EMPA.

Examples 2-4 show that $TiO_2$ and $ZrO_2$ in the A1148 isopipe of Examples 1 and 5 participates in the cassiterite precipitation in the glass of Table 1 by lowering the equilibrium solubility of the $SnO_2$ already dissolved in the glass. This occurs by Ti and Zr taking the structural sites in the glass structure that the Sn would normally occupy. The equilibrium solubility of the Table 1 glass at 1110° C. is about 0.25 wt. % in the presence of alumina, but in the presence of crystalline alumina and titania phases or alumina and zirconia phases it is only about 0.17 wt. %

Example 6

APA and AHPA alumina powder was obtained from Ceralox/Sasol. These powders have a low impurity content of less than 0.2 wt. % and can be purchased spray dried with binders and plasticizers. In particular, these powders include a small amount of MgO (added as $MgAl_2O_4$), 300 ppm, added as a sintering aid/grain growth inhibitor. A16 SG and A1000 SG alumina powders (with less than 0.2% impurities) was obtained from Almatis. 0.2 wt % MgO was added to the A16 SG and A1000 SG powder by dissolving magnesium acetate in methanol, adding it to the alumina powders in polymer beakers or shallow polymer trays, and drying. The dried A16 SG and A1000 SG powders (with the added magnesium acetate) were shaken in polyethylene bottles (with no media) in a vibro-mill for several hours.

The APA, AHPA, A16 SG and A1000 SG powders were cold iso-pressed at ~18 Kpsi in rubber molds in ~3 gram disks and ~0.5 and 5 pound square and round cross section rods/billets of up to ~15 inches in length. These where sintered using various heating schedules with the heating schedule for the larger rods taking more than 80 hours.

Figure 10:
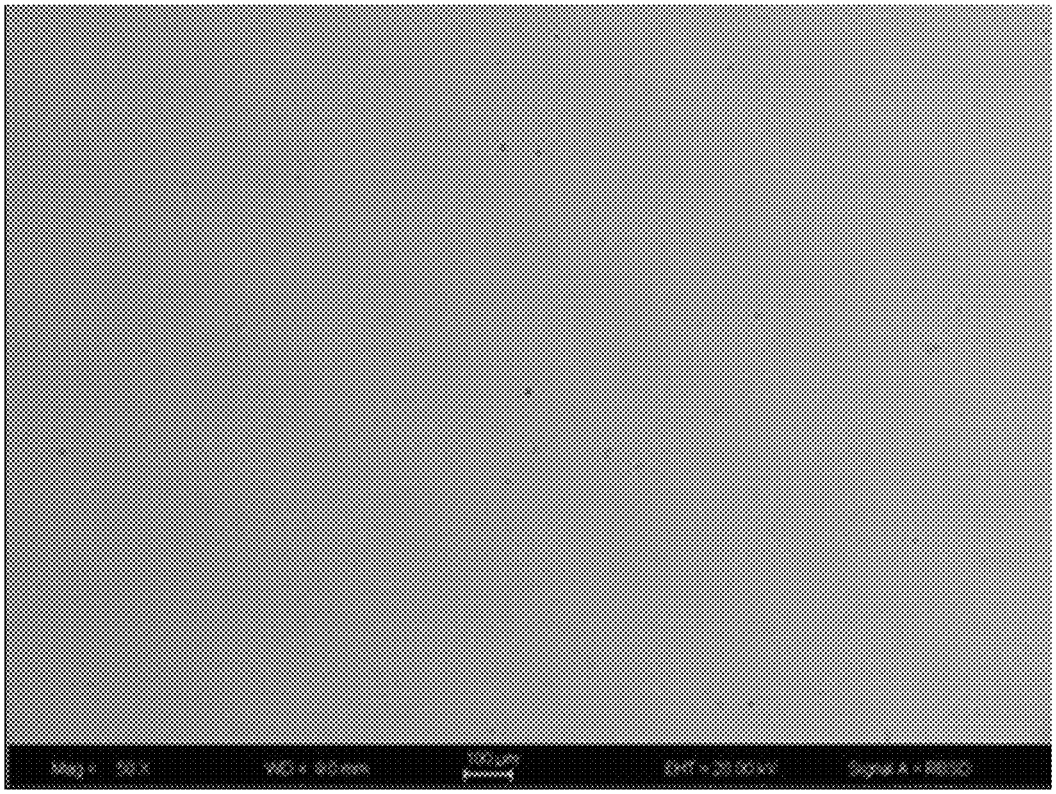
FIG. 10 is an SEM image of a sintered alumina sample that will not promote cassiterite ($SnO_2$) precipitation in glasses. The magnification for this figure was 50×. At a higher magnification of 1000×, porosity and secondary phases whose volume percent is less than 4 can be seen in this material.

A microstructure of a sample sintered from the Ceralox/Sasol APA powder is shown in FIG. 10. Note the lack of $TiO_2$, $ZrO_2$, $HfO_2$ and $SnO_2$ containing second phases. Samples from the AHPA Ceralox/Sasol powder, as well as the A16 SG and A1000 SG alumina powders with MgO from Mg acetate, also did not have any $TiO_2$, $ZrO_2$, $HfO_2$ or $SnO_2$ containing second phases. The A16 SG and A1000 SG samples had a similar microstructure to the Ceralox/Sasol powder samples, but had more $MgAl_2O_4$ second phases and some additional porosity, i.e., ~1-2 vol % more porosity.

Tables 11 and 12 show the compositions of the Ceralox/Sasol AHPA-RTP SB and APA-RTP SB powders and the Almatis A16 SG and A1000 SG powders as reported by their respective manufacturers.

Example 7

An alumina green body is prepared from the APA alumina powder of Example 6 by cold isopressing the powder at a pressure of 16000 psi for a period of approximately 10 minutes. Thereafter, the green body is sintered at 1550° C. for 24 hours. The fired green body has a length greater than 2.0 meters, a height greater than 0.25 meters, and a depth greater than 0.1 meters.

The fired green body is machined into an isopipe configuration. The machined isopipe is mounted in a fusion machine and used in the fusion process to produce a ribbon of glass which is cut into sheets which, after finishing, are provided to manufacturers of mobile electronic devices for use as faceplates. The glass composition is that of Table 1. The molten glass remains in contact with the isopipe for substantial periods of time at elevated temperatures. The surface of the isopipe is found to be compatible with the molten glass in that the finished glass sheets exhibit an average defect level (including $SnO_2$-containing defects) along their fusion lines below 1.0 defect per pound, where the average is taken over 100 sequential sheets.

Example 8

An alumina isopipe is made with 10 wt. % $SnO_2$. The $SnO_2$ grains are easily seen in the micro-structure. The $SnO_2$-containing alumina material is made into an isopipe sized for a small research melting operation. Over a multi-week period, small width sheets of an alkali containing glass, i.e., the glass of Table 1, are formed by a downdraw fusion process with an isopipe trough temperature of approximately 1215° C. and an isopipe root temperature of approximately 1110° C. The Table 1 glass is nearly saturated with batched $SnO_2$ for fining and a slight bit from the use of $SnO_2$-based electric heating electrodes that are used during melting of the glass. Copious cassiterite defects are found in the glass sheets as a function of time. In particular, numerous defects of less than 50 microns are found. Most of these smaller defects are found along the fusion line and are from glass interaction with the isopipe material. Optical microscopy and SEM and EPMA analysis of such cassiterite defects is done to confirm the identification. The experiment illustrates that an alumina isopipe material containing $SnO_2$ can form cassiterite defects in glasses that contain alkali and $SnO_2$.

From the foregoing, it can be seen that alumina isopipes have been provided that do not suffer from a propensity for defect formation (including $SnO_2$, $TiO_2$, $ZrO_2$ and/or $HfO_2$ precipitation) along the fusion line of glass sheets formed using the isopipe. Such isopipes result in higher glass quality, less rejected glass, and thus substantial cost savings. Compared to conventional alumina isopipes which can create fusion line cassiterite defects, the isopipes disclosed herein greatly expand the glass composition space available for achieving customer attributes and manufacturability.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

TABLE 1

| Component | Mole % |
|---|---|
| $SiO_2$ | 64.2 |
| $Al_2O_3$ | 13.9 |
| $B_2O_3$ | 7.1 |
| $Na_2O$ | 14.0 |
| $K_2O$ | 0.5 |
| MgO | 0.1 |
| CaO | 0.1 |
| SrO | 0.0 |
| $SnO_2$ | 0.1 |
| $(RO + R_2O)/Al_2O_3$ | 1.06 |

TABLE 2

| | | Glass compositions (weight percent) | | | | | | | | |
|---|---|---|---|---|---|---|---|---|---|---|
| Position | | | $SiO_2$ | $Al_2O_3$ | $Na_2O$ | $SnO_2$ | $ZrO_2$ | $TiO_2$ | $B_2O_3$ | $K_2O$ | Total |
| 1 Glass at top | Average | 57.4 | 20.9 | 13.12 | 0.26 | NA | NA | 7.67 | 0.71 | 100 |
| | Stdev | 0.4 | 0.1 | 0.06 | 0.01 | NA | NA | | | |
| 2 Between crystals | Average | 52.9 | 25.5 | 14.06 | 0.25 | NA | NA | 6.56 | 0.71 | 100 |
| | Stdev | 0.6 | 0.8 | 0.12 | 0.03 | NA | NA | | | |
| 3 Glass at top | Average | 57.7 | 21.1 | 12.59 | 0.27 | NA | 0.06 | 7.56 | 0.71 | 100 |
| | Stdev | 0.4 | 0.1 | 0.06 | 0.01 | NA | 0.02 | | | |
| 4 Between crystals | Average | 51.7 | 24.7 | 10.47 | 0.17 | NA | 3.27 | 9.02 | 0.71 | 100 |
| | Stdev | 0.6 | 0.2 | 0.16 | 0.02 | NA | 0.15 | | | |
| 5 Glass at top | Average | 58.3 | 21.3 | 12.86 | 0.24 | 0.01 | NA | 6.63 | 0.71 | 100 |
| | Stdev | 0.4 | 0.1 | 0.06 | 0.02 | 0.01 | NA | | | |
| 6 Between crystals | Average | 53.5 | 24.8 | 13.53 | 0.18 | 0.53 | NA | 6.72 | 0.71 | 100 |
| | Stdev | 0.6 | 0.3 | 0.11 | 0.02 | 0.07 | NA | | | |

Samples 1 & 2 = Corundum + Cassiterite + Table 1 Glass
Samples 3 & 4 = Corundum + Cassiterite + $TiO_2$ + Table 1 Glass
Samples 5 & 6 = Corundum + Cassiterite + $ZrO_2$ + Table 1 Glass
30 analyses each
$K_2O$ was fixed
$B_2O_3$ by difference

TABLE 3

| Sample | Position | $SnO_2$ (wt. %) |
|---|---|---|
| Corundum + Cassiterite + Table 1 Glass | Glass at top | 0.26 ± 0.01 |
| | Between crystals | 0.25 ± 0.03 |
| Corundum + Cassiterite + $TiO_2$ + Table 1 Glass | Glass at top | 0.27 ± 0.01 |
| | Between crystals | 0.17 ± 0.02 |
| Corundum + Cassiterite + $ZrO_2$ + Table 1 Glass | Glass at top | 0.24 ± 0.02 |
| | Between crystals | 0.18 ± 0.02 |

TABLE 4

Election Beam Analysis at 61 in FIG. 6 (weight percent)

| $SnO_2$ | $TiO_2$ | Total |
|---|---|---|
| 17.50 | 82.73 | 100.23 |
| 17.66 | 82.25 | 99.91 |
| 18.22 | 83.93 | 102.15 |
| 17.46 | 83.30 | 100.77 |
| 14.00 | 85.11 | 99.11 |

TABLE 5

Election Beam Analysis at 62 in FIG. 6 (weight percent)

| $SnO_2$ | $TiO_2$ | Total |
|---|---|---|
| 91.98 | 4.00 | 95.97 |
| 93.29 | 3.72 | 97.01 |
| 93.07 | 4.26 | 97.34 |
| 93.71 | 3.87 | 97.59 |
| 94.49 | 4.07 | 98.56 |

TABLE 6

Election Beam Analysis at 81 in FIG. 8 (weight percent)

| SnO$_2$ | ZrO$_2$ | Total |
|---|---|---|
| 8.4 | 90.5 | 98.9 |
| 9.7 | 89.8 | 99.6 |
| 9.5 | 89.6 | 99.1 |
| 8.8 | 90.0 | 98.8 |
| 2.3 | 96.1 | 98.4 |

TABLE 7

Election Beam Analysis at 82 in FIG. 8 (weight percent)

| SnO$_2$ | ZrO$_2$ | Total |
|---|---|---|
| 86.3 | 12.9 | 99.2 |
| 86.9 | 12.0 | 98.9 |
| 90.0 | 9.0 | 99.0 |
| 96.5 | 2.7 | 99.2 |
| 91.0 | 9.1 | 100.1 |

TABLE 8

A1148 Percent Areas

| | Pores | Al$_2$O$_3$ | Mullite | Glass | Zr—Ti—Al Oxides | Total |
|---|---|---|---|---|---|---|
| Average | 8.40 | 86.49 | 1.40 | 1.41 | 1.44 | 99.14 |
| Min | 7.95 | 85.21 | 0.99 | 1.32 | 1.26 | |
| Max | 8.97 | 87.60 | 1.65 | 1.48 | 1.53 | |

TABLE 9

A1148 Glass Phase (weight percent)

| Component | A1148 |
|---|---|
| SiO$_2$ | 64.8 ± 0.7 |
| Al$_2$O$_3$ | 21.6 ± 0.8 |
| TiO$_2$ | 1.9 ± 0.3 |
| K$_2$O | 0.11 ± 0.01 |
| Na$_2$O | 5.6 ± 0.5 |
| CaO | 3.3 ± 0.1 |
| MgO | 0.08 ± 0.01 |
| Fe$_2$O$_3$ | 0.53 ± 0.05 |
| ZrO$_2$ | 0.48 ± 0.06 |
| Total | 98.52 |

TABLE 10

A1148 Glass Phase (mole percent)

| Component | A1148 |
|---|---|
| SiO$_2$* | 73.66 |
| Al$_2$O$_3$ | 14.12 |
| TiO$_2$ | 1.59 |
| K$_2$O | 0.08 |
| Na$_2$O | 6.02 |
| CaO | 3.92 |
| MgO | 0.13 |
| Fe$_2$O$_3$ | 0.22 |
| ZrO$_2$ | 0.26 |
| Total | 100.00 |

*By difference

TABLE 11

| | Primary impurities (ppm) AHPA-RTP SB | Primary impurities (ppm) APA-RTP SB |
|---|---|---|
| Al$_2$O$_3$ Purity | >99.99% | 99.94% |
| Na | 15 | 10 |
| Si | 20 | 105 |
| Fe | 10 | 110 |
| Ca | 5 | 10 |
| Mg* | 300 | 300 |
| Ga | <5 | 40 |
| Cr | <2 | 10 |
| Ni | <2 | 5 |
| Ti | 15 | 30 |
| Zn | <2 | 45 |
| Zr | <2 | 3 |

*Mg level obtained from the addition of high purity magnesium aluminate spinel

TABLE 12

| Chemical Composition (wt. %) | A16 SG | A1000 SG |
|---|---|---|
| Al$_2$O$_3$ by difference | 99.8 | 99.8 |
| Na$_2$O | 0.07 | 0.07 |
| Fe$_2$O$_3$ | 0.02 | 0.02 |
| MgO | 0.05 | 0.05 |
| SiO$_2$ | 0.03 | 0.03 |
| CaO | 0.02 | 0.02 |
| B$_2$O$_3$ | <0.005 | <0.01 |

What is claimed is:

1. An isopipe comprising a body having a configuration adapted for use in a fusion process, said body comprising an alumina refractory that forms at least a part of at least one surface of the isopipe which comes into contact with molten glass during use of the isopipe, wherein:
   (i) the alumina refractory is a refractory material which comprises one or more Al$_2$O$_3$ phases which in combination are at least 90 volume percent of the refractory material including the refractory material's porosity;
   (ii) the tin concentration in the alumina refractory on an oxide basis is less than or equal to 1.0 weight percent; and
   (iii) the sum of the titanium, zirconium, and hafnium concentrations in the alumina refractory on an oxide basis is less than or equal to 1.5 weight percent.

2. A refractory block suitable for producing the isopipe of claim 1, said block having a length greater than 2 meters and comprising an alumina refractory wherein:
   (i) the alumina refractory is a refractory material which comprises one or more Al$_2$O$_3$ phases which in combination are at least 90 volume percent of the refractory material including the refractory material's porosity;
   (ii) the tin concentration in the alumina refractory on an oxide basis is less than or equal to 0.25 weight percent; and
   (iii) the sum of the titanium, zirconium, and hafnium concentrations in the alumina refractory on an oxide basis is less than or equal to 0.5 weight percent.

3. The refractory block of claim 2 wherein the one or more Al$_2$O$_3$ phases in combination are at least 95 volume percent of the refractory material including the refractory material's porosity.

4. The refractory block of claim 2 wherein the one or more Al$_2$O$_3$ phases in combination are at least 98 volume percent of the refractory material including the refractory material's porosity.

5. The refractory block of claim 2 wherein the titanium, zirconium and hafnium concentrations in the alumina refractory on an oxide basis are less than or equal to 0.5, 0.25 and 0.25 weight percent, respectively.

6. A method of making glass sheets comprising:
(a) forming a glass ribbon having a width of at least 1500 millimeters using an isopipe according to claim 1; and
(b) separating glass sheets from the glass ribbon;
wherein the glass making up the glass sheets comprises at least 5 weight percent alkali.

7. The isopipe of claim 1 wherein the one or more $Al_2O_3$ phases in combination are at least 95 volume percent of the refractory material including the refractory material's porosity.

8. The isopipe of claim 1 wherein the one or more $Al_2O_3$ phases in combination are at least 98 volume percent of the refractory material including the refractory material's porosity.

9. The isopipe of claim 1 wherein the tin concentration in the alumina refractory on an oxide basis is less than or equal to 0.5 weight percent.

10. The isopipe of claim 1 wherein the tin concentration in the alumina refractory on an oxide basis is less than or equal to 0.25 weight percent.

11. The isopipe of claim 1 wherein the sum of the titanium, zirconium, and hafnium concentrations in the alumina refractory on an oxide basis is less than or equal to 1.0 weight percent.

12. The isopipe of claim 1 wherein the sum of the titanium, zirconium, and hafnium concentrations in the alumina refractory on an oxide basis is less than or equal to 0.5 weight percent.

13. The isopipe of claim 1 wherein the titanium, zirconium, and hafnium concentrations in the alumina refractory on an oxide basis are less than or equal to 1.5, 1.0, and 1.0 weight percent, respectively.

14. The isopipe of claim 1 wherein the titanium, zirconium and hafnium concentrations in the alumina refractory on an oxide basis are less than or equal to 0.5, 0.25 and 0.25 weight percent, respectively.

* * * * *

UNITED STATES PATENT AND TRADEMARK OFFICE
CERTIFICATE OF CORRECTION

PATENT NO. : 10,421,681 B2
APPLICATION NO. : 13/112302
DATED : September 24, 2019
INVENTOR(S) : Matthew J. Dejneka et al.

Page 1 of 1

It is certified that error appears in the above-identified patent and that said Letters Patent is hereby corrected as shown below:

On page 2, in Column 2, item (56), other publications, Line 24, after "glassy" insert -- phase --.

Signed and Sealed this
Third Day of March, 2020

Andrei Iancu
*Director of the United States Patent and Trademark Office*